(12) United States Patent  
Smith et al.

(10) Patent No.: US 7,144,946 B2
(45) Date of Patent: Dec. 5, 2006

(54) CATIONIC POLYVINYL ALCOHOL-CONTAINING COMPOSITIONS

(75) Inventors: Hugh McIntyre Smith, 1826 Pinopolis Rd., Pinopolis, SC (US) 29469; William Clary Floyd, 1295 Lancaster Hwy., Chester, SC (US) 29706

(73) Assignees: Hugh McIntyre Smith, Pinopolis, SC (US); William Clary Floyd, Chester, SC (US)

( * ) Notice: Subject to any disclaimer, the term of this patent is extended or adjusted under 35 U.S.C. 154(b) by 56 days.

(21) Appl. No.: 10/324,715

(22) Filed: Dec. 19, 2002

(65) Prior Publication Data

US 2004/0122151 A1 Jun. 24, 2004

(51) Int. Cl.
- C08L 51/00 (2006.01)
- C08L 29/04 (2006.01)
- C08K 3/34 (2006.01)
- C08K 3/26 (2006.01)
- D21H 17/36 (2006.01)

(52) U.S. Cl. ............ 524/504; 524/503; 524/447; 524/425

(58) Field of Classification Search ........ 524/503, 524/504, 445, 425, 492, 447; 428/32.28, 428/32.29, 32.24, 32.38
See application file for complete search history.

(56) References Cited

U.S. PATENT DOCUMENTS

| | | | |
|---|---|---|---|
| 4,461,858 A * | 7/1984 | Adelman | 524/49 |
| 4,944,988 A * | 7/1990 | Yasuda et al. | 428/32.29 |
| 5,147,908 A | 9/1992 | Floyd et al. | |
| 5,270,103 A | 12/1993 | Oliver et al. | |
| 5,281,307 A | 1/1994 | Smigo et al. | |
| 5,380,403 A | 1/1995 | Robeson et al. | |
| 5,397,436 A | 3/1995 | Robeson et al. | |
| 5,536,764 A | 7/1996 | Nguyen et al. | |
| 5,637,196 A * | 6/1997 | Ogawa et al. | 162/135 |
| 5,654,359 A | 8/1997 | Hasegawa et al. | |
| 5,677,067 A * | 10/1997 | Kojima et al. | 428/32.27 |
| 5,718,756 A | 2/1998 | Mohler | |
| 6,036,993 A * | 3/2000 | Frazzitta | 427/8 |
| 6,060,566 A * | 5/2000 | Denzinger et al. | 525/455 |
| 6,133,365 A | 10/2000 | Verge et al. | |
| 6,150,289 A * | 11/2000 | Chen et al. | 501/148 |
| 6,177,188 B1 * | 1/2001 | Ichioka et al. | 428/32.2 |
| 6,207,258 B1 * | 3/2001 | Varnell | 428/32.1 |
| 6,338,891 B1 * | 1/2002 | Kawasaki et al. | 428/32.31 |
| 6,348,256 B1 | 2/2002 | Rabasco et al. | |
| 6,426,383 B1 | 7/2002 | Fong | |
| 6,482,883 B1 * | 11/2002 | Cuch et al. | 524/492 |
| 6,485,609 B1 | 11/2002 | Boylan | |
| 6,485,812 B1 * | 11/2002 | Sekiguchi | 428/32.29 |
| 2002/0064633 A1 * | 5/2002 | Wakata et al. | 428/195 |
| 2003/0125453 A1 * | 7/2003 | Triantafillopoulos et al. | 524/503 |
| 2003/0137571 A1 * | 7/2003 | Friedel et al. | 347/101 |

FOREIGN PATENT DOCUMENTS

| | | |
|---|---|---|
| JP | 55125109 | 9/1980 |
| JP | 58-186696 | 10/1983 |
| JP | 61230979 | 10/1986 |
| JP | 63149183 | 6/1988 |
| JP | 63162276 | 7/1988 |
| JP | 5278322 | 10/1993 |
| JP | 5278323 | 10/1993 |
| WO | WO 01/74599 A1 * | 10/2001 |

* cited by examiner

Primary Examiner—Callie Shosho

(57) ABSTRACT

Compositions including from about 1% to about 30% by weight of cationic polyvinyl alcohol graft copolymer in an aqueous solution, pigment, and other binding agents are useful in coatings for ink jet printing of paper, textile and plastic substrates, and also as wet end additives for papermaking. The polyvinyl alcohol has a weight average molecular weight between about 13,000 and about 140,000 and is between about 86 and 100 mole % hydrolyzed.

8 Claims, No Drawings

CATIONIC POLYVINYL ALCOHOL-CONTAINING COMPOSITIONS

BACKGROUND OF THE INVENTION

1. Technical Field

The present invention relates to compositions, particularly for coating paper, plastic film, or textiles, or wet end additives for papermaking, comprising aqueous solutions of cationic polyvinyl alcohol, more particularly the chloride quaternary salt of cationic polyvinyl alcohol.

2. Background Information

Cationic starch has long been used as a wet end additive for improving certain properties of paper sheets generated by the papermaking process. These properties include wet web strength, tensile strength, burst strength, and filler-loading capacity. The cationic charges on the starch molecules are believed to attract the starch to the anionically charged pulp fibers in a dilute aqueous dispersion. Not all of the starch is retained on the pulp fiber, though; excess starch is lost in the water expelled as a byproduct of the papermaking process. When the white water is discharged to a stream, lake, or other effluent discharge point, the high starch levels in the effluent increase biological oxygen demand (BOD). High BODs are known to disrupt the natural biological balance in the stream or other body of water to which the effluent is discharged.

On an equal film thickness or weight basis, polyvinyl alcohol has been reported to impart much greater wet web strength, tensile strength, etc. than starch; however, polyvinyl alcohol cannot be made cationic by the same inexpensive process as starch. An efficient process for preparing cationic polyvinyl alcohol has long been elusive.

A process is known for copolymerizing vinyl acetate and vinyl acetamide, then hydrolyzing the polymer to obtain what is apparently a copolymer of vinyl alcohol and vinyl amine. The product is neutralized with hydrogen chloride to make a hydrochloride salt, which is commercially available. Unfortunately, copolymers containing primary amine functional groups are often associated with paper yellowing problems. This is believed to be caused by these copolymers forming chromophores with glyoxal-containing paper additives during the papermaking process.

A process is also known for producing cationic polyvinyl alcohol by reacting a melamine-formaldehyde resin acid colloid with a solution of polyvinyl alcohol. Unfortunately, this process is tedious and time-consuming and its byproducts include formaldehyde, which is suspected to be a carcinogen.

Another process involves reacting a cationic polyacrylamide and blocked glyoxal resin with polyvinyl alcohol. This process is tedious, difficult to reproduce, and the product generally has a short shelf life.

The present invention includes compositions for coatings or wet end applications containing a graft copolymer of polyvinyl alcohol and a quaternized (meth)acrylic monomer. The chloride quaternary salt of cationic polyvinyl alcohol in particular has been found herein to be surprisingly and unexpectedly better than other quaternary salts of cationic polyvinyl alcohol, notably the dimethyl sulfate quaternary salt, for use in wet end applications and ink jet coatings. Furthermore, polyvinyl alcohol with certain molecular weight ranges and degrees of hydrolysis in the formulas herein convey particular advantages for the applications discussed herein.

The compositions of the present invention preferably include cationic polyvinyl alcohol of a controlled molecular weight range and degree of hydrolysis. The molecular weight and hydrolysis ranges are selected according to the anticipated end application. The formulas of the present invention offer great variety and consistency by controlling the degree of cationic charge possessed by the cationic polyvinyl alcohol. Formulas with a cationic polyvinyl alcohol with a greater or lesser cationic charge can be created according to the intended application. This is accomplished by selecting polyvinyl alcohol starting material with a certain molecular weight range and degree of hydrolysis, and by manipulating the amount and type of (meth)acrylic quaternary monomer and catalyst used in the process of manufacturing the cationic polyvinyl alcohol. Formulas containing cationic polyvinyl alcohol with a low cationic charge are preferred for wet end applications. Also, formulas containing polyvinyl alcohol with a higher molecular weight and a higher degree of hydrolysis are preferred as a starting point for wet end applications because they provide greater strength to the end product. Coating compositions containing cationic polyvinyl alcohol with higher amounts of cationic charge are preferred for use in coating paper, as well as plastic film and textile substrates used in ink jet printing. It is believed that this is because the anionic charges of the ink chromaphores are better immobilized by the cationic charges in the coating, giving a sharper image. Aqueous coating compositions containing lower molecular weight polyvinyl alcohol are preferred for coating, since higher solids can be achieved.

The present invention describes formulations and ratios for use in both wet end applications and ink jet coating applications. It is believed that the advantages of the formulations of the present invention are surprising and unexpected, and are not taught or suggested by prior art references.

BRIEF SUMMARY OF THE INVENTION

The present invention is a coating composition for paper, plastic film, or textile substrates, comprising:

(a) between about 1% and about 30% by weight of cationic polyvinyl alcohol graft copolymer in an aqueous solution with between about 2 and about 50% solids by weight, the polyvinyl alcohol having an average molecular weight between about 13,000 and about 140,000 and being between about 86 and 100 mole % hydrolyzed;

(b) between about 50% and about 70% by weight of at least one pigment; and (c) between about 25% and about 40% by weight of at least one other binding agent.

Other coating auxiliaries commonly employed in coating compositions may also be included herein. Improvements are seen in image sharpness, image resolution, and ink receptivity of paper coated with the coating compositions of the present invention versus conventional coating compositions.

Also included herein is a wet end additive composition for addition during papermaking, the composition comprising:

(a) between about 0.5% and about 10 pounds per ton of paper of cationic polyvinyl alcohol in an aqueous solution with between about 2 and about 50% solids by weight, the polyvinyl alcohol having a weight average molecular weight between about 21,000 and about 140,000 and being between about 86 and 100 mole % hydrolyzed;

(b) between about 5% and about 25% by weight of at least one filler;

(c) between about 2 and about 4 pounds per ton of paper of at least one sizing agent; and (d) between about 0.5 and about 3 pounds per ton of paper of at least one retention aid.

DETAILED DESCRIPTION OF THE INVENTION

The present invention includes a coating composition for coating paper, plastic film, or textiles, including:

(a) between about 1% and about 30% by weight of cationic polyvinyl alcohol in an aqueous solution with between about 2 and about 50% solids by weight, the polyvinyl alcohol having a weight average molecular weight between about 13,000 and about 140,000 and being between about 86 and 100 mole % hydrolyzed;

(b) between about 50% and about 70% by weight of at least one pigment; and (c) between about 25% and about 40% by weight of at least one other binding agent. Other coating auxiliaries commonly employed in coating compositions may also be included herein.

The present invention also includes a wet end additive composition for addition to a slurry during papermaking, which includes:

(a) between about 0.5 and about 10 pounds/ton of paper of cationic polyvinyl alcohol in an aqueous solution with between about 2 and about 50% solids by weight, the polyvinyl alcohol having a weight average molecular weight between about 21,000 and about 140,000 and being between about 86 and 100 mole % hydrolyzed;

(b) between about 5% and about 25% by weight of at least one filler;

(c) between about 2 and about 4 pounds/ton of paper of at least one sizing agent; and (d) between about 0.5 and about 3 pounds/ton of paper of at least one retention aid.

A main ingredient included in these compositions is cationic polyvinyl alcohol. Suitable polyvinyl alcohol for producing the cationic polyvinyl alcohol herein is available in granular or powder form, or in aqueous solution. Polyvinyl alcohol with suitable molecular weight ranges and degrees of hydrolysis for use herein are commercially available. A preferred cationic polyvinyl alcohol is poly(dimethylamino ethyl acrylate)/polyvinyl alcohol graft copolymer, most preferably a methyl chloride quaternary salt of poly (dimethylamino ethyl acrylate)/polyvinyl alcohol graft copolymer.

The cationic polyvinyl alcohol preferred for use herein is aqueous form, preferably an aqueous solution with between about 10 and about 25% solids by weight. More preferred is an aqueous solution of the methyl chloride quaternary salt of poly(dimethylamino ethyl acrylate)/polyvinyl alcohol graft copolymer, which is between about 15 and 20% solids by weight. The preferred polyvinyl alcohol for use herein has a weight average molecular weight between about 13,000 and about 50,000, and is between about 86 and about 98 mole % hydrolyzed.

Polyvinyl alcohol is available fully hydrolyzed (99 to 100 mole % hydrolysis of acetate groups), partially hydrolyzed (about 85 to 88 weight % hydrolysis), or a mixture thereof. Lesser degrees of hydrolysis, called in the industry "intermediate" (about 93 to 94 weight %) hydrolysis, or "partial" hydrolysis are believed to provide improved receptivity to certain inks, with less water sensitivity.

For the coating compositions herein, the polyvinyl alcohol preferably has a relatively low weight average molecular weight between about 13,000 and about 50,000. This relatively low molecular weight polyvinyl alcohol is less viscous than high molecular weight polyvinyl alcohol. It has been found that this relatively low molecular weight is associated with higher coating solids, which makes it easier to dry the coatings on the desired substrate. This saves time and labor and is a processing aid. The low viscosity/high solids content is thus an attractive advantage of the present process/compositions.

For the wet end additive compositions herein, the polyvinyl alcohol preferably has a higher weight average molecular weight between about 85,000 and about 186,000, more preferably between about 85,000 and about 125,000. It is believed that the higher molecular weight polymer has greater strength than lower molecular weight material for the applications herein.

For coating compositions herein, from about 86 to 100 mole % hydrolyzed polyvinyl alcohol is preferred. However, for ink jet coatings in particular, from about 86 to about 94 mole % hydrolyzed polyvinyl alcohol is most preferred. This is because it has been found that a relatively lower level of hydrolysis results in a better performing ink jet composition. Specifically, this partial degree of hydrolysis is preferred for ink jet coating compositions because the partially hydrolyzed cationic polyvinyl alcohol provides better wetting and ink receptivity. Water resistance is not as important a characteristic for ink jet compositions. Without meaning to be bound by theory, it is believed that better ink absorbance is obtained because the film is more porous (open) with the lower degree of hydrolysis.

Fully and super hydrolyzed grades are preferred for wet end applications herein. For wet end applications herein, from about 98 to 100 mole % hydrolyzed polyvinyl alcohol is most preferred. Without meaning to be bound by theory, it is believed that this high level of hydrolysis translates to improved water resistance because the polymer hydrogen bonds better with pulp fibers and itself during the papermaking process.

The cationic polyvinyl alcohol used in the present coating compositions is aqueous, with a moderate solids level. In contrast, currently available cationic polyvinyl alcohol that is dry must be pre-mixed prior to use. The dry ingredient is difficult to mix into solution, and must be heated during mixing. This extra step adds labor and requires an additional mixing vessel with a heating source. It can also be dangerous. The aqueous solution of cationic polyvinyl alcohol used in the present invention avoids this extra, labor-intensive step. Also, the aqueous solution of the present invention is easy to pump into the mixing tank, easy to measure, and easy to mix with the other ingredients in the mixing tank.

The viscosity of the final product allows for a composition that is easy to measure out, pump, and utilize. This product viscosity has been found to facilitate laying a suitably thin coating on the paper, plastic film, or textile substrate, which is nevertheless thick enough to evenly adhere to the paper.

Coating compositions of the present invention are suitable for high end applications, such as photo-quality ink jet printing. Preferred inks for use herein contain anionic dyes, which flocculate and become immobilized upon contact with the cationic additives in the coatings of the present invention.

The coating compositions herein preferably have a viscosity of between about 100 and about 5000 centipoise, most preferably between about 400 and about 900 centipoise for ink jet coatings, as measured by a Brookfield viscometer with a #3 spindle at 100 rotations per minute, or a #3 at 20 rpm.

A preferred pigment for inclusion herein is from about 1 to about 20% by weight of calcium carbonate. The preferred pigments further include from about 40 to about 70 parts of a calcined clay, and/or from about 20 to about 40 parts of silica, most preferably precipitated silica or silica gel.

The coating compositions herein include other, non-cationic binding agents. By "non-cationic other binders" is meant binding agents other than the cationic polyvinyl alcohol that are not positively charged. Suitable other binders for use herein include non-cationic polymers, starches, and proteins. Preferred other binding agents are between about 1 and about 15% by weight of a nonionic polyvinyl alcohol, and/or between about 10 and about 30% by weight of cationic waxy maize or other starches.

Other additives suitable for inclusion in the compositions herein include optical brightener, dye, defoamer, and/or a thickener. The compositions herein preferably further include between about 0.05% and about 1% by weight of an optical brightener. Suitable optical brighteners include polyaromatic hydrocarbons. The compositions herein preferably further include between about 0.01% and about 1% by weight of a dye, most preferably a blue dye. The compositions herein preferably further include between about 0.01% and about 2% by weight of a defoaming agent.

The compositions herein preferably further include between about 1% and about 5% by weight of a thickening agent. Suitable thickening agents for use herein include xanthan gum, and hydroxyethylcellulose.

Other additives, such as pH adjusting agents, may optionally be included in the compositions herein. Suitable pH adjusting agents for use herein include sodium carbonate, soda ash, sodium hydroxide, ammonium hydroxide, potassium hydroxide, lithium hydroxide, and lithium carbonate.

A preferred catalyst for use in preparing the cationic polyvinyl alcohol graft copolymer herein is ammonium or potassium persulfate, or hydrogen peroxide. The compositions herein most preferably further include between about 0.01% and about 2% by dry weight of ammonium or potassium persulfate on weight of the polyvinyl alcohol. Similar amounts of persulfate and hydrogen peroxide can be used herein. Where hydrogen peroxide is employed, a trace amount of a metal salt, such as ferric chloride or cupric chloride, is included to activate the peroxide. It has been found that although hydrogen peroxide may not graft as well as a persulfate in the process herein, there is beneficially no residual sulfate byproduct of the process where hydrogen peroxide is used as the catalyst.

Also included herein are compositions including the polyvinyl alcohol graft described herein copolymerized with a mixture of at least one quaternary monomer and at least one nonionic, water-soluble monomer. The latter, water-soluble nonionic monomer is preferably acrylamide, methacrylamide, N,N-dimethyl acrylamide, N-methylol acrylamide, N-methylol methacrylamide, hydroxyethyl acrylate, hydroxyethyl methacrylate, and/or vinyl pyrrolidone. Such compositions are preferably for ink jet printing on a paper, film, or textile substrate, and are between about 0.5 and about 50 weight % of the water-soluble nonionic monomer. A coating composition made with this product exhibits improved ink receptivity, printability, resolution, ink density, color-fastness, fade resistance, and other improvements.

The present invention also includes the wet end additive composition for addition to a slurry during papermaking, which includes:

(a) between about 0.5% and about 10 pounds/ton of paper of cationic polyvinyl alcohol in an aqueous solution with between about 2 and about 50% solids by weight, the polyvinyl alcohol having a weight average molecular weight between about 21,000 and about 140,000, and being between about 86 and 100 mole % hydrolyzed;
(b) between about 5% and about 25% by weight of at least one filler;
(c) between about 2 and about 4 pounds/ton of paper of at least one sizing agent; and
(d) between about 0.5 and about 3 pounds/ton of paper of at least one retention aid.

Preferred compositions herein further comprise from about 3 to about 12 pounds/ton of alum, and/or from about 6 to about 20 pounds/ton of cationic starch. In the preferred wet end compositions herein:
1) the filler is calcium carbonate or clay.
2) the cationic polyvinyl alcohol is a methyl chloride quaternary salt of poly(dimethylamino ethyl acrylate)/polyvinyl alcohol graft copolymer.
3) the sizing agent is alkenyl succinic anhydride (ASA) or alkylketene dimer (AKD).
4) the retention aid is cationic polyacrylamide, polyamine, or other suitable conventional retention aids.

For wet end applications, formulas containing cationic polyvinyl alcohol, preferably the methyl chloride quaternary salt, with a molecular weight range between about 21,000 and about 125,000 are preferred. These compositions impart strength to the paper end product of the papermaking process, yet they are soluble in water. Solubility in water is important because significant amounts of water are used in papermaking process and the composition ingredients must be well-distributed so that they do not clump in the sheets of paper. The cationic polyvinyl alcohol-containing compositions herein are added to the pulp slurry at the beginning of the papermaking process, prior to formation of the sheet. These compositions have been found to have good results for many of the advantageous physical properties of paper, including tensile, burst, tear (CD), fold, stiffness, and/or curl parameters. These indicate that the cationic polyvinyl alcohol-containing formulas herein are strengthening the sheets of paper.

The cationic polyvinyl alcohol of the wet end additive compositions herein is not associated with elevated BODs (Biological Oxygen Demand) in the body of water to which the process water is discharged. In contrast with starch-containing additives, cationic polyvinyl alcohol, and the present additive compositions containing it, have less of an adverse environmental impact than conventional starch-based compositions.

Quaternary monomers suitable for graft polymerization onto polyvinyl alcohol include: quaternary salts, most preferably methyl chloride and methyl sulfate, of dialkylamino alkyl acrylates, methacrylates, acrylamides, and methacrylamides. Most preferred for use herein is the methyl chloride quaternary salt of dimethylamino ethyl acrylate.

Suitable processes herein for making cationic polyvinyl alcohol also include copolymerization of a water-soluble non-quaternary monomer, such as hydroxyethyl acrylate, N-methylol acrylamide, or acrylamide, with these quaternary salts.

The cationic polyvinyl alcohol made by a process according to the present invention may be cross-linked by various nonionic or cationic hydroxyl-reactive cross-linking agents, such as, but not limited to: glyoxal, glyoxal-based insolubilizers; thermosetting resins such as melamine-formaldehyde (MF) resins; dimethylol dihydroxy ethylene urea (DM-DHEU) resins; certain transition-metal complexes, such as ammonium titanium lactate, ammonium zirconium lactate, and ammonium zirconium carbonate; or certain colloidal silicas. This cross-linking is believed to improve tensile strength, elongation resistance and water-resistance.

The process for the graft-polymerization of aminoalkyl acrylate or aminoalkyl methacrylate onto polyvinyl alcohol includes the steps of:
  (a) charging a reactor vessel with polyvinyl alcohol and water and mixing the mixture;
  (b) heating the reactor vessel under an inert atmosphere to a temperature of between about 89 and 93 degrees Centigrade until the mixture is solubilized;
  (c) cooling the mixture to a temperature of between about 78 and 87 degrees Centigrade;
  (d) adding a catalyst to the mixture; and
  (e) charging an aqueous quaternary salt of a dialkylamino ethyl acrylate monomer to the reactor vessel and mixing. The final product is not dried to eliminate the water content, nor is it precipitated.

The process preferably further comprises the steps of: (f) adding additional catalyst to the mixture and holding the mixture for a period of between about 10 minutes and about one hour; (g) cooling the mixture to a temperature between about 38 and 48 degrees Centigrade; (h) filtering the mixture through a filter with a mesh size between about 50 and 250 microns; and/or (i) stirring an effective amount of a biocide into the mixture.

In a preferred process for making the cationic polyvinyl alcohol:
  1) the catalyst is ammonium or potassium persulfate, or hydrogen peroxide.
  2) the polyvinyl alcohol has a molecular weight between about 13,000 and about 140,000.
  3) in step (b), the mixture is heated for a period of between about 10 minutes and about one hour.
  4) the acrylate/quaternary product is charged to the reactor vessel slowly over a period of between about 10 and 60 minutes.
  5) the quaternary salt is methyl chloride or methyl sulfate quaternary salt.
  6) the acrylate monomer is the quaternary salt of dialkylamino ethyl acrylamide, or dialkylamino ethyl methacrylamide.
  7) the acrylate monomer is the quaternary salt of dialkylamino ethyl acrylate, or dialkylamino ethyl methacrylate.

The process preferably further comprises the step (d2), after step (d), of: graft copolymerizing a mixture of at least one quaternary monomer and at least one water-soluble, nonionic monomer with the monomer mixture ranging from about 1% to about 150% by weight of the polyvinyl alcohol. Here, the quaternary monomer is preferably a methyl chloride quaternary salt of a dimethylamino ethyl acrylate. The nonionic monomer is preferably acrylamide or methacrylamide, N,N-dimethyl acrylamide, N-methylol acrylamide, or N-methylol methacrylamide, or mixtures thereof. The nonionic monomer may also be hydroxyethyl acrylate, hydroxyethyl methacrylate, or vinyl pyrrolidone, or mixtures thereof.

The following examples are intended to further illustrate the invention and facilitate its understanding. These examples are given solely for the purposes of illustration and are not to be construed as limiting the present invention in any way.

EXAMPLE I

A procedure for preparing cationic polyvinyl alcohol begins with the following formula:

TABLE 1

Formula

| Weight % | Item |
|---|---|
| 35.73 | Deionized water |
| 12.86 | Low mw polyvinyl alcohol |
| 1.43 | Medium mw polyvinyl alcohol |
| 7.15 | Deionized water for rinsing |
| 0.07 | Ammonium persulfate |
| 3.57 | Deionized water |
| 1.43 | Dimethylaminoethyl acrylate/methyl chloride quaternary (80% solution) |
| 0.02 | Ammonium persulfate |
| 1.43 | Deionized water |
| 36.31 | Deionized water |
| 100.00% | Total |

Procedure

A procedure suitable for preparing cationic polyvinyl alcohol on a small scale in a laboratory or the like is as follows:

To a 2-liter resin kettle is charged, with moderate agitation: a first portion of deionized water, 357.3 grams, 128.6 grams of the fully hydrolyzed low molecular weight polyvinyl alcohol, and 14.3 grams of the fully hydrolyzed medium molecular weight polyvinyl alcohol. The kettle interior is rinsed with 71.5 grams of deionized water for rinsing. A nitrogen blanket is applied and the reaction is heated to 90–92 degrees Centigrade for 30 minutes to solubilize the polyvinyl alcohol. While the batch is heating, the catalyst and monomer charges are prepared. A 0.7 gram quantity of ammonium persulfate is dissolved in 35.7 grams of deionized water. A 14.3 gram quantity of an 80 weight % aqueous solution of the dimethylaminoethyl acrylate/methyl chloride quaternary is placed in an additional funnel.

After the polyvinyl alcohol has been solubilized, the reaction is cooled to a temperature of between 80 and 85 degrees Centigrade. The catalyst solution is charged to the kettle, and the monomer is slowly added over 15 minutes. The reaction is held at 80–85 degrees Centigrade for 30 minutes after addition of the monomer has been completed. During the hold, the finishing catalyst is prepared. A 0.2 gram quantity of ammonium persulfate is dissolved in 14.3 grams of deionized water. This is added at the end of the holding period, and held for an additional 30 minutes. The final water charge, 363.1 grams, is added, and the batch is cooled to 40 degrees Centigrade. The finished product is filtered through a 100 micron filter to afford a clear, colorless solution.

Results

The clear product has a pH of 4.5, a viscosity of 490 centipoise (#3 spindle, 100 rotations per minute Brookfield), and is 15.7 weight % solids.

When the ammonium salt is substituted for the potassium persulfate, the resulting product provides increased gloss to the ink jet coating.

EXAMPLE II

A procedure suitable for preparing an aqueous solution of cationic polyvinyl alcohol is as follows:

TABLE 2

Formula

| Grams | Item |
|---|---|
| 841 | Deionized water |
| 130.8 | Ultra low mw polyvinyl alcohol |
| 14.5 | Low mw polyvinyl alcohol |
| 2.9 | Potassium persulfate |
| 11.6 | Dimethylaminoethyl acrylate/methyl chloride quaternary (80% aqueous solution) |
| 5 drops | Biocide |

Procedure

To a 2-liter resin kettle is added 726.6 g of deionized water, 130.8 grams of a commercially available fully hydrolyzed, ultra low molecular weight polyvinyl alcohol, and 14.5 grams of a commercially available fully hydrolyzed, low molecular weight polyvinyl alcohol. The low molecular weight polyvinyl alcohol has a weight average molecular weight range between about 31,000 and 50,000. The ultra low molecular weight polyvinyl alcohol has a weight average molecular weight range between about 13,000 and 23,000 and is between about 98.0 and 98.8% hydrolyzed. The mixture is agitated and blanketed with nitrogen as it is heated to 90 degrees Centigrade for 30 minutes to solubilize the polyvinyl alcohol. After the 30 minute hold, the temperature is reduced to 85 degrees Centigrade. A catalyst solution is prepared by dissolving 2.9 grams of potassium persulfate in 75.6 grams of deionized water, and charged to the reactor. After a 10 minute hold, 11.6 grams of an 80% aqueous solution of dimethylaminoethyl acrylate/methyl chloride quaternary is added over a 10 minute period. The reaction is held for 30 minutes at 80 to 85 degrees Centigrade. During the hold, the finishing catalyst is prepared by dissolving 1.4 grams of potassium persulfate in 36.6 grams of deionized water. The finishing catalyst is then added to the batch and the reaction is held at 80 to 85 degrees Centigrade for an additional 30 minutes. The batch is cooled to 35 degrees Centigrade and 5 drops of biocide is added. The batch is filtered through a 150 micron bag to afford a clear, pale amber solution.

Results

The cationic polyvinyl alcohol product is 16% solids, with a pH of 3.5, and a Brookfield viscosity (#3 spindle, 100 rpm) of 500 centipoise (cps).

EXAMPLE III

In order to assess compatibility with glyoxal-based insolubilizers, the following experiment is carried out using a sample of the aqueous (16% solids) cationic polyvinyl alcohol product from Example II.

Procedure

A 25 gram quantity of the product of Example II, above, is diluted to 5 weight % solids with 55 grams of water. The pH is adjusted to between 6.5 and 7.5 with a 10% sodium hydroxide solution. A sheet of copy paper is saturated with this solution and run through a nip roll under 30 psig (pounds per square inch) pressure. The sheet of paper is then dried and cured for 3 minutes at 121 degrees Centigrade in forced air oven. A second saturant solution is prepared as above, but 0.5 gram of glyoxal (5% dry glyoxal on dry polymer) is added. A sheet of copy paper is saturated as above and dried in like manner.

Results

Both sheets are identical in whiteness by visual inspection. No yellowing is evident.

Conclusion

The cationic polyvinyl alcohol sample does not cause yellowing. This is noteworthy in that other "vinyl amine" type of cationic polyvinyl alcohol are reported to yellow when insolubilized with glyoxal-based insolubilizers. Without meaning to be bound by theory, it is believed that the primary amino functionality in such products reacts with glyoxal to form Schiff bases, which are known to form chromaphores, and that the quaternary amino functionality of the present invention cannot form such Schiff bases.

EXAMPLE IV

In order to explore whether product made by the instant process has advantageous cross-linking, the following experiment is carried out using samples of the product from Example II and the following ingredients.

TABLE 3

Ingredients

Ammonium titanium lactate (30% solids)
Cationic colloidal silica (15% solution)
Cationic polyvinyl alcohol
Water Procedure Ten grams of sample from Example II are weighed into a beaker. To this is added 0.2 gram of a 1:1 mixture of ammonium titanium lactate (30% solids) and water. This is mixed well and a 4 gram sample of this product is dried for 1 hour at 65 degrees Centigrade in a forced air oven. The resulting film is cured 15 minutes at 120 degrees Centigrade.

This procedure is repeated with 10 grams samples from Example II, and the following:

(b) 0.4 gram of ammonium titanium lactate solution (30% solids);

(c) 0.1 gram of cationic colloidal silica (15% solution);

(d) 0.2 gram of cationic colloidal silica (15% solution);

(e) 0.2 gram ammonium titanium lactate solution (30% solids) and 0.1 gram of cationic colloidal silica (15% solution);

(f) 0.4 gram of ammonium titanium lactate solution (30% solids) and 0.2 gram of cationic colloidal silica (15% solution); and (g) cationic polyvinyl alcohol without cross-linkers, as a control.

The resulting six films are dried in aluminum weighing pans. To each pan is added 12 grams of water. Each pan is floated in a water bath heated to 60 to 70 degrees Centigrade. The water in the sample pans is replenished as it evaporates.

Results

The film of the last sample, (g) cationic polyvinyl alcohol without crosslinking agent, slowly dissolves in the warm water. The other samples (a–f) swell in the warm water, but do not dissolve.

Conclusion

The dissolution of the cationic polyvinyl alcohol sample in the warm water indicates that crosslinking has not occurred in this sample. The failure of the other samples to dissolve in the warm water indicates that crosslinking has occurred in those samples, providing improved water resistance.

EXAMPLE V

An ink jet formula is prepared by combining the following ingredients, with stirring:

TABLE 4

Ink Jet Formula

| Ingredient | Amount (parts) |
| --- | --- |
| Calcined clay | 55 |
| Precipitated silica or silica gel | 30 |
| Calcium carbonate | 8 |
| Nonionic polyvinyl alcohol | 7 |
| Cationic polyvinyl alcohol | 20 |
| Cationic waxy maize | 20 |
| Optical brightener | 4 |
| Blue dye | 0.3 |
| Defoamer, as needed | same |
| Water, to make 55–60% solids | same |

Procedure

A coating composition for ink jet coating is prepared from the formula listed in Table 4, above. The aqueous cationic polyvinyl alcohol used herein is a methyl chloride quaternary salt of cationic polyvinyl alcohol. The ingredients are stirred into the coating composition. The resulting coating composition is a 55 to 60% solids slurry in water. The coating composition is applied to paper, dried and calendered.

Results

The resulting composition has a viscosity of 800 centipoise, as measured by a Brookfield viscometer using a #3 spindle at 100 rpm. The resulting composition is an effective ink jet coating composition, and shows excellent image quality.

EXAMPLE VI

A wet end additive formula for use in making paper is prepared using the following:

TABLE 5

| Ingredient | Amount (lbs/ton of paper) |
| --- | --- |
| Calcium carbonate | 200 to 400 |
| Cationic polyvinyl alcohol | 1 to 3 dry |
| Cationic starch | 6 to 20 dry |
| Sizing agent | 2 to 4 |
| Retention aid | 1 to 1.5 |
| Aluminum sulfate | 10 |
| Pulp | 1600 to 1800 |
| Water to dilute to 3% solids | |

Procedure

A "thick stock" aqueous pulp slurry is prepared, which is approximately 3% solids, using the above Table 5 formula. This is held in a "thick stock" tank, and then diluted to 0.5% solids with water to make a "dilute pulp" for formation of the paper sheet. Some of the additives are added into the dilute stock. Continuing with the process, the "dilute pulp" is piped from a dilute pulp tank to a wire web, where it is deposited. The wire web supports the fibers while the excess water drains away. The drainage, which is called "white water", is recycled back to the dilute pulp tank. The paper sheet is formed as the water drains away.

EXAMPLE VII

To explore wet end applications of cationic polyvinyl alcohol made according to the present invention, an alkaline sheet of 20 pound copy paper is produced with a pilot paper machine using the following formula:

Formula

Pulp-75 weight % hardwood, 25 weight % softwood-refined to 300 csf 16 weight % calcium carbonate 3 pounds/ton of paper of AKD size 10 pounds/ton of paper of alum retention aid, as needed 2 pounds/ton of paper of cationic polyvinyl alcohol Procedure The cationic polyvinyl alcohol is produced by the process described in Example I herein. For comparison purposes, a second batch of alkaline 20 pound copy paper, and a control batch of 20 pound copy paper, are produced in the same fashion as the cationic polyvinyl alcohol paper using the same pilot paper machine at the same settings. In the second batch, 15 pounds of cationic starch is substituted for the 2 pounds of cationic polyvinyl alcohol. The control batch does not include any starch or polyvinyl alcohol (strength) additives.

The physical properties of the alkaline sheets of paper, including burst, burst index, tensile index, breaking length, tear, tear index, fold, stiffness, and curl, are then assessed. The following table contains the results.

Results

TABLE 6

Physical Properties

|  | Control | 15 lb cat starch | 2 lb cat pva | gain(loss) % |
|---|---|---|---|---|
| Burst-top | 9.45 | 10.06 | 13.1 | 30.2 |
| bottom | 9.3 | 9.125 | 12.95 | 41.9 |
| Burst index-top | 1.17 | 1.25 | 1.62 | 29.6 |
| bottom | 1.15 | 1.13 | 1.61 | 51.3 |
| Tensile index-top | 23.7 | 26.1 | 25.7 | (1.5) |
| bottom | 16.2 | 17.2 | 19.9 | 15.7 |
| Breaking length-MD | 4.04 | 4.43 | 4.37 | (4.9) |
| bottom | 2.74 | 2.92 | 3.38 | 15.6 |
| Tear-CD | 44.03 | 46.75 | 60.25 | 28.9 |
| Tear index-CD | 1.00 | 1.03 | 1.13 | 9.7 |
| Fold-MD | 16 | 11 | 23 | 109 |
| -CD | 12 | 8 | 17 | 112 |
| Stiffness-MD | 0.98 | 0.88 | 2.13 | 142 |
| -CD | 0.58 | 0.63 | 1.13 | 79.3 |
| Curl-4" | 22 | 3.5 | 1.6 | 54.3 |

Key:
Cat = cationic;
PVA = polyvinyl alcohol;
MD = machine direction;
CD = cross direction

Conclusion

Overall, the paper produced with the formula containing cationic polyvinyl alcohol performs significantly better than the sheets of the control paper or the paper produced with the starch formulas under the parameters tested. Paper produced with a formula containing cationic polyvinyl alcohol can then be expected to perform better than paper produced with a conventional formula.

EXAMPLE VIII

For comparison, a wet end stock formula is made by combining the following ingredients. One of each of the following three ingredients is incorporated into an appropriate amount of wet end stock formula to equal 100%:
- 10 pounds/ton of cationic starch
- 1.57 pounds/ton of the dimethyl sulfate quaternary salt of cationic polyvinyl alcohol
- 1.0 pounds/ton of the methyl chloride quaternary salt of cationic polyvinyl alcohol The latter two salts are made according to Example I, above.

Paper is produced on a pilot paper machine with an equal amount of these three formulae and dried. The results of tests performed on the paper samples produced with the three different formulae are as follows:

Results

TABLE 7

Wet End Data

|  | Cat Starch | DM Sulfate Salt | M Chloride Salt |
|---|---|---|---|
| Burst- Top | 10.06 | 13.1 | 20.5 |
| -Bottom | 9.125 | 12.95 | 17.3 |
| Burst Index- Top | 1.25 | 1.62 | 1.76 |
| -Bottom | 1.13 | 1.61 | 1.48 |
| Tensile Index- Top | 26.1 | 25.7 | 37.3 |
| -Bottom | 17.2 | 19.9 | 24.0 |
| Breaking length MD | 4.43 | 4.373 | 3.8 |
| CD | 2.92 | 3.376 | 2.4 |
| Tear CD | 46.75 | 60.25 | 63.2 |
| Fold MD | 11 | 23 | 26 |
| CD | 8 | 17 | 15 |

Key:
Cat = cationic;
M = methyl;
DM = dimethyl;
MD = machine direction;
CD = cross direction

Conclusion

Overall, the results for the formula containing the methyl chloride quaternary salt of cationic polyvinyl alcohol indicate superior performance in comparison to the results for the formulas containing the dimethyl sulfate quaternary salt of cationic polyvinyl alcohol, and the cationic starch. The superior performance of the methyl chloride quaternary over the higher amount of the methyl sulfate quaternary is quite unexpected.

EXAMPLE IX

A procedure for preparing cationic polyvinyl alcohol begins with the following formula:

TABLE 8

Formula

| Weight % | Item |
|---|---|
| 23.48 | Deionized water |
| 8.44 | Low mw polyvinyl alcohol |
| 0.94 | Medium mw polyvinyl alcohol |
| 4.69 | Deionized water for rinsing |
| 0.04 | Ammonium persulfate |
| 2.34 | Deionized water |
| 0.94 | Dimethylaminoethyl acrylate/methyl chloride quaternary |
| 3.75 | 50% aqueous acrylamide solution |
| 16.41 | Deionized water |
| 0.01 | Ammonium persulfate |
| 0.94 | Deionized water |
| 38.02 | Deionized water |
| 100.00% | Total |

Procedure

A procedure suitable for preparing cationic polyvinyl alcohol on a small scale in a laboratory or the like is as follows:

To a 2-liter resin kettle is charged, with moderate agitation: a first portion of deionized water (234.8 grams), 84.4 grams of the fully hydrolyzed low molecular weight polyvinyl alcohol, and 9.4 grams of the fully hydrolyzed medium molecular weight polyvinyl alcohol. The kettle interior is rinsed with 46.9 grams of deionized water for rinsing. A nitrogen blanket is applied and the reaction is heated to between 90 and 92 degrees Centigrade for 30 minutes to solubilize the polyvinyl alcohol. While the batch is heating, the catalyst and monomer charges are prepared. A 0.4 gram quantity of ammonium persulfate is dissolved in 23.4 grams of deionized water. A 9.4 gram quantity of an 80 weight % aqueous solution of the dimethylaminoethyl acrylate!methyl chloride quaternary is mixed with the aqueous acrylamide solution and the deionized water and mixed. The mixture is then placed in an addition funnel.

After the polyvinyl alcohol has been solubilized, the reaction is cooled to a temperature of between 80 and 85 degrees Centigrade. The catalyst solution is charged to the kettle, and the monomer is slowly added over 60 minutes. The reaction is held at 80–85 degrees Centigrade for 30 minutes after addition of the monomer has been completed. During the hold, the finishing catalyst is prepared. A 0.1 gram quantity of ammonium persulfate is dissolved in 9.4 grams of deionized water. This is added at the end of the holding period, and held for an additional 30 minutes. The final water charge (380.2 grams), is added, and the batch is cooled to 40 degrees Centigrade. The finished product is filtered through a 100 micron filter to afford a clear, colorless solution.

Results

The clear product has a pH of 4.5, a viscosity of 370 centipoise (#3 spindle, 100 rotations per minute Brookfield), and is 12.0 weight % solids.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

It is to be understood that any amounts given herein are illustrative, and are not meant to be limiting. All ratios, parts, percentages, proportions, and other amounts stated herein are on a weight basis, unless otherwise stated herein, or otherwise obvious to one skilled in the art to which the invention pertains. All temperatures herein are in degrees Celsius, unless otherwise stated herein.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wet end additive composition for addition to a slurry during papermaking, composition comprising:
    a. between about 0.5 pounds and about 10 pounds per ton of paper of a cationic polyvinyl alcohol in an aqueous solution with between about 2 and about 50% solids by weight, the polyvinyl alcohol having a weight average molecular weight between about 21,000 and about 140,000 and being between about 86% and 100% mole percent hydrolyzed, wherein the cationic polyvinyl alcohol is a methyl chloride quaternary salt of poly (dimethylamino ethyl acrylate/polyvinyl alcohol graft copolymer or a methyl sulfate quaternary salt of poly (dimethylamino ethyl acrylate)/polyvinyl alcohol graft copolymer
    b. between about 5% and 25% by weight of at least one filler;
    c. between about 2 and about 4 pounds per ton of paper of at least one sizing agent; and
    d. between 0.5 and about 3 pounds per ton of paper of at least one retention aid.

2. The wet end composition according to claim 1, wherein the at least one filler is calcium carbonate.

3. The wet end composition according to claim 1 wherein the at least one filler is kaolin clay.

4. The wet end composition according to claim 1, wherein the at least one sizing agent is alkenyl succinic anhydride.

5. The wet end composition according to claim 1, wherein the at least one sizing agent is alkylketene dimer.

6. The wet end composition according to claim 1, wherein the cationic polyvinyl alcohol has a weight average molecular weight between about 85,000 and about 125,000 and is from about 98 to 99 mole % hydrolyzed.

7. The wet end composition according to claim 1, further comprising from about 3 to about 12 pounds per ton of alum.

8. The wet end composition according to claim 1, further comprising from about 5 to about 20 pounds per ton of cationic starch.

* * * * *